No. 658,965. Patented Oct. 2, 1900.
C. E. SENNA.
NECKTIE HOLDER.
(Application filed June 21, 1900.)
(No Model.)
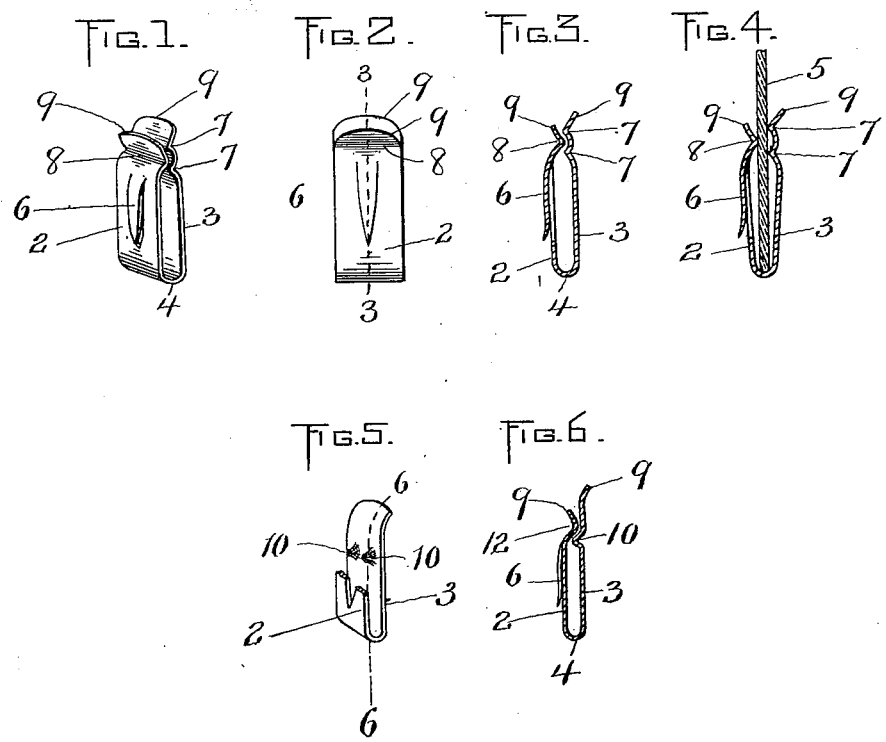

UNITED STATES PATENT OFFICE.

CHARLES E. SENNA, OF BOSTON, MASSACHUSETTS.

NECKTIE-HOLDER.

SPECIFICATION forming part of Letters Patent No. 658,965, dated October 2, 1900.

Application filed June 21, 1900. Serial No. 21,086. (No model.)

*To all whom it may concern:*

Be it known that I, CHARLES E. SENNA, of Boston, in the county of Suffolk and State of Massachusetts, have invented certain new and useful Improvements in Necktie-Holders, of which the following is a specification.

This invention relates to an appliance adapted to be engaged with a standing collar and with a cravat or necktie surrounding the same to prevent the tie from slipping upwardly or endwise on the collar.

The invention has for its object to provide a simple and effective device of this character adapted to be conveniently applied to the collar and to engage the same without liability of slipping downward on the collar.

The invention consists in the improvements which I will now proceed to describe and claim.

Of the accompanying drawings, forming a part of this specification, Figure 1 represents a perspective view of a necktie-holder embodying my invention. Fig. 2 represents a side view of the same. Fig. 3 represents a section on line 3 3 of Fig. 2. Fig. 4 represents a view similar to Fig. 3, showing the holder engaged with a collar. Fig. 5 represents a perspective view of a modified form of necktie-holder embodying my invention, a portion of the holder being broken away. Fig. 6 represents a section on line 6 6 of Fig. 5.

The same reference characters indicate the same parts in all the figures.

My improved holder is formed by bending a strip of metal to form two arms 2 3 and a connecting-neck 4, the metal being resilient and formed so that the arms 2 3 have a tendency to close yieldingly upon a collar 5, placed between them. The outer arm 2 is provided with an outwardly-projecting spur 6, struck up from the body of the arm, the point of the spur projecting downwardly in position to engage the inner side of a cravat or necktie and prevent the same from slipping upwardly or endwise. The inner sides of the arms 2 and 3 are provided with collar-engaging jaws formed to exert a frictional hold upon the surfaces of the collar 5, and thus prevent the holder from slipping downwardly on the collar. I find that this result is best secured by the construction shown in Figs. 1, 2, 3, and 4, one of the arms having two jaws 7 7, formed by corrugating the arm near its outer end, while the other arm has a single jaw 8 similarly formed, the jaw 8 being between the jaws 7 7 and out of alinement therewith, so that when the device is in use the jaws 7 7 will bear on the collar at points above and below the point on which the jaw 8 bears. This arrangement of jaws is more effective than would be the case if the jaws of one arm were arranged to bear upon the collar at a point directly opposite the bearing of a jaw on the other arm.

The arms 2 3 are provided at their outer extremities with oppositely-inclined guides 9 9, which form a flaring throat and facilitate the application of the device to the collar, the lower edge of the collar entering between the guides 9 9.

In Figs. 5 and 6 I show a modification in which each of the arms 2 and 3 is provided with one jaw, the jaw of the arm 3 being composed of two bosses 10 10, formed by pressing portions of the material of the arm inwardly, as shown in Fig. 5. These bosses are arranged to bear on the collar at a point below the line on which the jaw 12 of the arm 3 bears, said pieces 10 10 being out of alinement with the jaw 12.

I claim—

1. A necktie-holder comprising a strip of metal bent to form two resilient arms, one of which has an outwardly-projecting integral tie-engaging spur, the free ends of said arms having integral collar-engaging jaws on their inner faces out of alinement with each other.

2. A necktie-holder comprising a strip of metal bent to form two resilient arms, one of which has an outwardly-projecting integral tie-engaging spur, the free ends of said arms having integral collar-engaging jaws on their inner faces, and oppositely-inclined guides above said jaws to facilitate the application of the holder to the collar.

3. A necktie-holder comprising a strip of metal bent to form two resilient arms, one of which has an outwardly-projecting integral tie-engaging spur, the free end of one arm having an inclined guide and two integral collar-engaging jaws, while the free end of the other arm has an inclined guide and a collar-engaging jaw located between the jaws of the other arm.

In testimony whereof I have affixed my signature in presence of two witnesses.

CHARLES E. SENNA.

Witnesses:
 MARCUS B. MAY,
 A. D. HARRISON.